United States Patent Office 3,395,232
Patented July 30, 1968

3,395,232
SOIL-BORNE NEMATODE CONTROL BY SEEDS TREATED WITH 2,4-DIHALOPHENYL ESTER OF LOWER ALKANE AND HALOALKANE SULFONIC ACIDS
Lyle V. White, Modesto, Calif., assignor to Shell Oil Company, New York, N.Y., a corporation of Delaware
No Drawing. Filed July 29, 1965, Ser. No. 475,877
5 Claims. (Cl. 424—303)

ABSTRACT OF THE DISCLOSURE

Treatment of seeds with nematocidal 2,4-dihalophenyl sulfonates wherein the halogen substituents are different.

---

This invention relates to a novel method for protecting plants from attack by soil-dwelling nematodes. According to the method of the invention, such protection is effected by treating the seeds of plants to be grown in nematode-infested soil by one or more of certain dihalophenyl esters of alkane- and haloalkane-sulfonic acids. The invention thus relates to a method for treating seed. It also relates to compositions of matter adapted to the treatment of seeds.

To control root infesting nematodes with conventional volatile nematocides the farmer generally has to apply large quantities of the active ingredient per acre. Quantities up to 20 gallons per acre are frequently required for nematode control. Use of such large quantities requires specialized application equipment. Further most of the currently employed chemicals are highly volatile and require proper placement in the soil. In addition most of the popular nematocides are quite phytotoxic and the soil must be aerated for several days after their use. This practice places a severe limitation on the types of crops upon which such nematocides can be used. In general the use of nematocides has been restricted to high value crops.

There now has been found a class of compounds which are outstandingly effective as seed treatment nematocides. Seeds treated prior to planting with these compounds will protect the root system of the growing plant for prolonged periods of time. This method of protecting plants from nematode attack is of great practical significance in that it provides an inexpensive and agronomically advantageous means of nematode control heretofore not possible. Seed treatment offers a promising means of nematode control for many low value crops. In addition it provides a means of nematode control which does not require specialized techniques of application, expensive equipment or much manpower. This labor-saving method of nematode control offers a practical control means for most annual crops.

No known commercially available nematocides are effective as seed-treating agents for the control of soil-borne nematodes. It is a surprising property of the alkanesulfonates used according to this invention to be highly effective as seed-treating agents and yet at nematocidally effective dosages to be relatively non-phytotoxic to the germinating plant grown from treated seed.

The lower alkanesulfonates used according to the invention are derivatives of 2,4-dihalophenol wherein each halogen substituent on the phenyl ring is different. The unusual and unexpected combination of biological properties of the compounds of the invention appear to be imparted by virtue of the mixed halogen substitution on the phenyl ring. Such alkanesulfonates have a high degree of nematocidal effectiveness as evidenced by their activity as seed treatment agents.

The 2,4-dihalophenyl sulfonates used according to the invention are characterized by the formula:

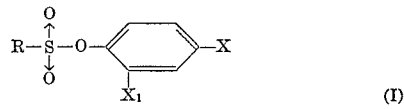

(I)

wherein X and $X_1$ are each different halogens and R is alkyl or monohaloalkyl of one to four carbon atoms. When R is haloalkyl, middle-haloalkyl (chloro- and bromoalkyl) are preferred because of their high nematocidal activity. The halogens may be selected from chlorine, bromine, fluorine or iodine. Typical of such mixed 2,4-diahalophenyl alkanesulfonates are:

2-chloro-4-bromophenyl methanesulfonate
2-bromo-4-chlorophenyl methanesulfonate
2-bromo-4-chlorophenyl chloromethanesulfonate
2-bromo-4-chlorophenyl bromomethanesulfonate
2-fluoro-4-bromophenyl methanesulfonate
2-fluoro-4-bromophenyl chloromethanesulfonate
2-fluoro-4-chlorophenyl methanesulfonate
2-iodo-4-bromophenyl methanesulfonate
2-iodo-4-chlorophenyl methanesulfonate
2-chloro-4-bromophenyl ethanesulfonate
2-chloro-4-bromophenyl chloroethanesulfonate
2-bromo-4-fluorophenyl ethanesulfonate
2-fluoro-4-iodophenyl ethanesulfonate
2-chloro-4-bromophenyl propanesulfonate
2-iodo-4-chlorophenyl propanesulfonate
2-bromo-4-iodophenyl propanesulfonate
2-chloro-4-bromophenyl butanesulfonate
2-fluoro-4-chlorophenyl butanesulfonate
2-iodo-4-chlorophenyl butanesulfonate A preferred class of mixed-halosulfonates used according to the invention comprises those members represented by the formula:

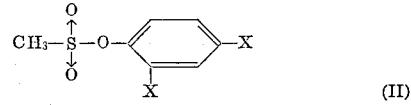

(II)

wherein X and $X_1$ are each different halogens. Such mixed 2,4-dihalophenyl methanesulfonates are preferred because of their effectiveness as seed-treatment nematocides and are typified by the following compounds.

2-chloro-4-bromophenyl methanesulfonate
2-bromo-4-chlorophenyl methanesulfonate
2-iodo-4-chlorophenyl methanesulfonate
2-iodo-4-fluorophenyl methanesulfonate
2-chloro-4-iodophenyl methanesulfonate
2-chloro-4-fluorophenyl methanesulfonate
2-bromo-4-iodophenyl methanesulfonate
2-fluoro-4-bromophenyl methanesulfonate
2-fluoro-4-chlorophenyl methanesulfonate A still further preferred class of compounds used according to the invention are those compounds of Formula II wherein each X and $X_1$ is either chlorine, bromine or fluorine and is different. Such preferred compounds because of their high level of activity as seed treatment agents are typified by:

2-chloro-4-bromophenyl methanesulfonate
2-bromo-4-chlorophenyl methanesulfonate
2-fluoro-4-bromophenyl methanesulfonate
2-fluoro-4-chlorophenyl methanesulfonate The mixed halophenyl sulfonates used according to the invention are readily prepared by the reaction of the appropriate 2,4-dihalophenol with the appropriate alkanesulfonyl chloride in the presence of an acid acceptor such as pyridine. Other acid acceptors such as aqueous solutions of sodium hydroxide, potassium hydroxide, or other suitable bases may be employed.

Suitable phenol reactants include 4-bromo-2-chlorophenol, 2-bromo-4-chlorophenol, 4-bromo-2-fluorophenol, 4-iodo-2-chlorophenol, 4-fluoro-2-chlorophenol and the like. Many of these mixed dihalophenols are commercially available, others may be readily prepared according to known methods of the art, given by J. Am. Chem. Soc. 81, 94 (1959), for example. Appropriate alkanesulfonyl chlorides include methanesulfonyl chloride, ethanesulfonyl chloride or other lower alkanesulfonyl chlorides. Because of its ready availability, methanesulfonyl chloride is preferred.

The reaction is carried out in liquid phase at temperatures in the range of 10° C. to 50° C. Most conveniently the reaction is conducted at room temperature—that is at temperatures of 20° C. to 30° C. In general the reaction is most conveniently conducted at atmospheric pressure. Pressure conditions are not considered to be critical and if necessary superatmospheric or subatmospheric conditions may be employed.

The reaction of the 2,4-mixed dihalophenol and alkanesulfonyl chloride is carried out in the presence of a solvent. Suitable solvents include ether, ethanol, methanol, pyridine and water.

The reaction of the mixed dihalophenol and the alkanesulfonyl chloride is generally complete in 30 minutes to two hours. In certain instances it may be advantageous to conduct the process over shorter reaction times such as 10 to 15 minutes or even to employ longer reaction times— say four hours.

The reaction product in some instances is a solid and in other instances is liquid. It is conveniently separated from the reaction mixture in good yield by conventional methods of separation known to the art.

The invention should not be regarded as limited by the following examples. Parts given in the preparative examples are parts by weight unless otherwise noted and parts by weight bear the same relation to parts by volume as does the kilogram to the liter.

Example I.—Preparation of 2-chloro-4-bromophenyl methanesulfonate

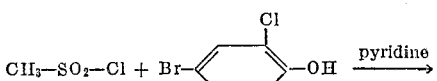

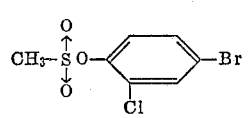

To a solution of 20.8 parts (0.1 mole) of 4-bromo-2-chlorophenol in 50 parts by vol. of pyridine there was added 11.5 parts (0.1 mole) of methanesulfonyl chloride. A precipitate formed rapidly and after standing two hours at room temperature the mixture was poured into 1,000 parts by vol. of water. The oil which separated crystallized on standing and was recrystallized from hexane to give colorless crystals; M.P. 73–4° C.; yield, 23 parts or 81% of theor. Structure was confirmed by infra-red and elemental analysis (percent by weight).

| Elemental Analysis | Percent Cl | Percent Br | Acid Elem., g./equiv. |
|---|---|---|---|
| Calculated for SO₃BrClC₇H₆ | 12.4 | 28.0 | 71.4 |
| Found | 12.3 | 28.2 | 73.4 |

Example II.—Preparation of 2-bromo-4-chlorophenyl methanesulfonate

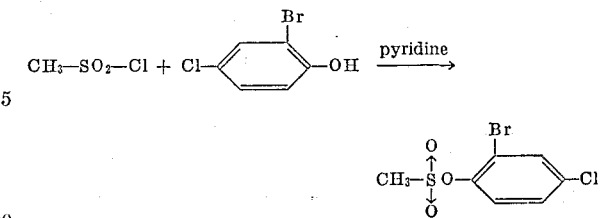

To a solution of 20.8 parts (0.1 mole) of 2-bromo-4-chlorophenol in 50 parts by vol. of pyridine there was added 11.5 parts( 0.1 mole) of methanesulfonyl chloride. There was a rapid formation of precipitate and after two hours at room temperature the reaction mixture as poured into 1,000 parts by vol. of water. The precipitated oil crystallized and was recrystallized from hexane to yield colorless crystals; M.P. 58–59° C. The yield 23 parts or 81% of theor. The structure was confirmed by infra-red and elemental analysis (percent by weight).

| Elemental Analysis | Percent Cl | Percent Br | Percent S | Acid Elem., g./equiv. |
|---|---|---|---|---|
| Calculated for SO₃BRCl₇H₆ | 12.4 | 28.0 | 11.2 | 71.4 |
| Found | 12.4 | 27.2 | 11.4 | 72.4 |

Example III.—Preparation of 2-fluoro-4-bromophenyl methanesulfonate

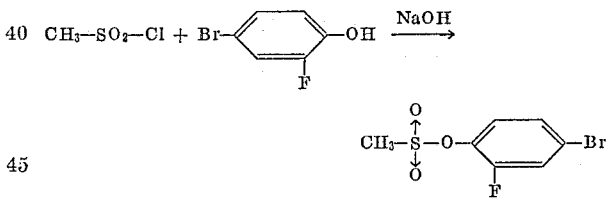

11.5 parts (0.06 mole) of 4-bromo-2-fluorophenol and 8 parts (0.07 mole) of methanesulfonyl chloride were dissolved in 30 parts by vol. of ether and cooled to 10° C. An aqueous solution of sodium hydroxide (28 parts of 10% solution; 0.07 mole) was added slowly with stirring and the reaction mixture then was warmed to 30° C. for 30 minutes. The ether layer was separated, the aqueous layer extracted three times with 100 parts by vol. of ether and the ether solutions combined. The ether solution was dried, stripped and the residue distilled at 115–120° C. (0.3 mm.) to yield 12 parts (75% of theor.) of colorless liquid. The structure was confirmed by elemental analysis (percent by weight).

| | Percent Br | Acid Elem. g./equiv. |
|---|---|---|
| Calculated for SO₃BrFC₇H₆ | 29.8 | 67.2 |
| Found | 31.0 | 70.3 |

Example IV.—Preparation of 2-fluoro-4-chlorophenyl methanesulfonate

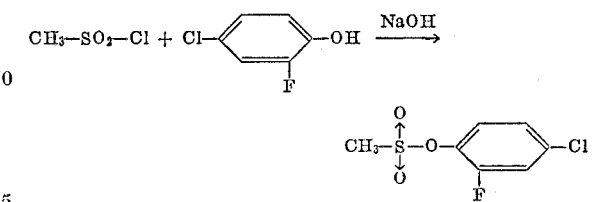

7.3 parts (0.05 mole) of 4-chloro-2-fluorophenol and 8 parts (0.07 mole) of methanesulfonyl chloride was dissolved in 30 parts by vol. of ether and cooled to 0° C. Aqueous sodium hydroxide (24 parts of 10% solution; 0.06 mole) was added slowly with stirring during 10 minutes (cooling was necessary). The mixture warmed to 20° C. and 70 parts by vol. of benzene was added. The organic phase was separated, dried and distilled. The product distilled at 113–118° C. (0.3–0.7 mm.) to yield 8.1 parts (73% of theor.) of colorless liquid. The structure was confirmed by elemental analysis (percent by weight).

|  | Percent Cl | Acid Elem., g./equiv. |
|---|---|---|
| Calculated for $SO_3ClFC_7H_6$ | 15.8 | 56.2 |
| Found | 15.8 | 58.2 |

Example V.—Nematode control by seed treatment

Approximately 25 to 30 tomato seeds were soaked in 1000 parts per million of the test compound in water for 24 hours. The seeds were then filtered off from the test solution, washed several times with clear water and then planted in root-knot nematode infested soil. After approximately six weeks, the plants were removed from the soil, their roots washed in running water and the roots were examined for root-knot nodules. Table I lists the degree of control obtained by representative compounds of the invention.

TABLE I.—NEMATODE CONTROL BY SEED TREATMENT

| Compound: | Percent control 1000 p.p.m. |
|---|---|
| 2-chloro-4-bromophenyl methanesulfonate | 100 |
| 2-bromo-4-chlorophenyl methanesulfonate | 100 |
| 2-fluoro-4-bromophenyl methanesulfonate | 96 |
| 2-fluoro-4-chlorophenyl methanesulfonate | 98 |
| 2-iodo-4-chlorophenyl methanesulfonate | 45 |
| 2-chloro-4-bromophenyl chloromethanesulfonate | 75 |

Thus the alkanesulfonates used according to the invention have been found to be effective toxicants as seed treating agents against soil-dwelling nematodes—that is the unsegmented roundworms of the class Nematoda, also known as eelworms, which customarily inhabit soil and feed upon the roots of plants growing therein. These mixed dihalophenyl sulfonates are particularly effective against the important economic root-knot nematodes of the genus, Meloidogyne.

The mixed halophenyl sulfonates of the invention have also been found to be highly effective when impregnated onto inert seed coating solid carriers and the coated seeds were planted in nematode infested soil.

The compounds used according to the method of the invention may be employed as liquid or as dust compositions.

Liquid compositions containing up to 50% by weight the desired amount of the active agent may be prepared by dissolving the chemical in an inert organic solvent such as acetone, isopropyl alcohol, carbon tetrachloride or the like. By the use of suitable emulsifying and dispersing agents the sulfonates can be emulsified or dispersed in water and the emulsion applied to the soil to be treated to provide effective control of the nematodes therein. Any of the usual emulsifying and dispersing agents commonly employed in forming aqueous emulsions and suspensions of water-insoluble materials can be used for this purpose. Generally but a small concentration of the emulsifying agent is required, as little as 0.05 percent of the weight of the final formulation being effective in many cases, while seldom will more than about 10% of the weight of the final formulation be required. Usually, the concentration of the emulsifying or dispersing agent will be from about 0.5 to about 5% of the weight of the formulation. Alternatively, or in addition, in some cases it may be of advantage to dissolve the sulfonate or sulfonates to be used in a solvent which can readily be dispersed in water to produce a heterogeneous dispersion of the nematocide in the water.

A modification of the wet process for treating seed is the so-called slurry method. The slurry method involves correctly proportioned quantities of seed and seed treating agent in the form of suspension brought together more or less continuously. Very little of the seed and treating agent are in the treating vessel at any one time and efficient coverage of the entire seed coat with the slurry is readily achieved. Slurry treated seed seldom requires a separate drying process. Slurry treatment of seed is commonly employed in the seed-treatment art.

For several types of seed it may be advantageous to employ solid seed-treatment formulations. The methanesulfonate may be blended with or impregnated on to a solid inert carrier. The carrier should not be hygroscopic so that the final formulation will remain dry and free flowing. Suitable inert carriers are those well known to the art including various grades of carbon, the clays such as the kaolinites, the bentonites and the attapulgites; other minerals in natural state such as talc, pyrophyllite, quartz, diatomaceous earth, fuller's earth chalk, rock phosphate and sulfur; and chemically modified minerals, such as acid washed bentonites, precipitated calcium phosphates, precipitated calcium carbonate and colloidal silica. These diluents may represent a substantial portion, for example, 50 to 98 percent by weight of the entire formulation.

It is essential that the seed coating formulation be brought in intimate contact with the seed. To achieve this, especially in the case of slurry and dust seed-coaters, it is frequently necessary to add such agents as methylcellulose or ethylcellulose to promote adherence. The quantity of such an adherence promoter required in the seed-coating formulation will vary from 0.1 percent by weight to about 20 percent by weight depending upon the formulation and the type of seed to be treated.

The quantity of the seed protectant formulation to give effective nematode control will vary with the type of formulation employed, the type of seed to be treated and the species of nematode to be controlled. In general approximately 0.1 an ounce to about 25 ounces of the formulation per 100 pounds of seeds will give effective nematode control.

The nematode seed-treating formulation may contain as well another pesticide, such as a fungicide or an insecticide or a plant growth promoting substance.

I claim as my invention:

1. A method for combatting soil-borne nematodes which comprises introducing into the soil seeds treated with a nematocidally effective amount of a compound of the formula:

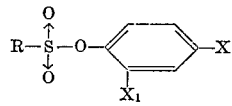

wherein each X and $X_1$ is a different halogen and R is a member of the group consisting of alkyl, monochloroalkyl and monobromoalkyl of one to four carbon atoms.

2. A method for combatting soil-borne nematodes which comprises introducing into the soil seeds treated with a nematocidally effective amount of 2-bromo-4-chlorophenyl methanesulfonate.

3. A method for combatting soil-borne nematodes which comprises introducing into the soil seeds treated with a nematocidally effective amount of 2 - chloro - 4 - bromophenyl methanesulfonate.

4. A process for treating seed comprising contacting said seeds with a nematocidally effective amount of a compound of the formula:

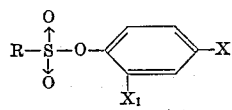

wherein each X and $X_1$ is a different halogen and R is a member of the group consisting of alkyl, monochloroalkyl and monobromoalkyl of one to four carbon atoms.

5. The product obtained by the process of claim 4.

References Cited

UNITED STATES PATENTS 3,346,613  10/1967  Larson et al. _____ 260—456
3,228,827  1/1966   Larson et al. _____ 167—30

LEWIS GOTTS, *Primary Examiner.*

S. K. ROSS, *Assistant Examiner.*